United States Patent
Yoshida et al.

(10) Patent No.: US 6,201,926 B1
(45) Date of Patent: Mar. 13, 2001

(54) APPARATUS FOR RECORDING DIGITAL PICTURE SIGNAL

(75) Inventors: Yumi Yoshida, Ebina; Yasuhiko Teranishi, Yokosuka; Seiji Higurashi, Tokyo, all of (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 08/998,594

(22) Filed: Dec. 29, 1997

(30) Foreign Application Priority Data

Aug. 26, 1997 (JP) .................................................. 9-244626

(51) Int. Cl.[7] .................................................. H04N 5/783
(52) U.S. Cl. .................................. 386/68; 386/81; 386/111
(58) Field of Search .................................. 386/6–8, 33, 68, 386/81–82, 111–112, 125–126, 45; H04N 5/76, 5/92, 5/783

(56) References Cited

U.S. PATENT DOCUMENTS

| | | | |
|---|---|---|---|
| 5,982,987 | * | 11/1999 | Sakazaki .................................. 386/68 |
| 6,031,960 | * | 2/2000 | Lane .................................. 386/68 |
| 6,064,794 | * | 5/2000 | McLaren et al. .................................. 386/68 |

* cited by examiner

Primary Examiner—Thai Tran
(74) Attorney, Agent, or Firm—Lowe Hauptman Gopstein Gilman & Berner (57) ABSTRACT

Code words, which correspond to orthogonal-transform-resultant coefficients having order numbers equal to or higher than an order number "n+1", are deleted from code words composing each 1-intra-frame segment of an input digital picture signal to generate special picture data with a frame period NS on the basis of the input digital picture signal. Estimation is made as to a code amount CF(nmin) of special picture data generated by deleting code words, which correspond to orthogonal-transform-resultant coefficients having order numbers equal to or higher than an order number "nmin+1", from code words composing a 1-intra-frame segment of the input digital picture signal, where "nmin" denotes a lower limit of an order number "n". The frame period NS of the special picture data and a target code amount C are decided so that the estimated code amount CF(nmin) will be equal to or smaller than the target code amount C. The input digital picture signal is recorded on a recording medium. The special picture data is recorded on predetermined positions in the recording medium.

6 Claims, 5 Drawing Sheets

| | X → | | | | | | |
|---|---|---|---|---|---|---|---|
| 1 | 2 | 6 | 7 | 15 | 16 | 28 | 29 |
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 3

| | X → | | | | | | |
|---|---|---|---|---|---|---|---|
| d1 | d2 | d6 | d7 | 0 | 0 | d28 | 0 |
| d3 | d5 | 0 | 0 | 0 | 0 | 0 | 0 |
| 0 | 0 | 0 | d18 | 0 | 0 | 0 | 0 |
| d10 | 0 | 0 | 0 | 0 | d41 | 0 | 0 |
| 0 | 0 | 0 | 0 | 0 | 0 | 0 | 0 |
| 0 | d23 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

APPARATUS FOR RECORDING DIGITAL PICTURE SIGNAL

BACKGROUND OF THE INVENTION

1. Field of the Invention

This invention relates to an apparatus for recording a digital picture signal resulting from a compression process using orthogonal transform.

2. Description of the Related Art

A digital picture signal conforming to the MPEG standards results from a compression process using orthogonal transform. Such an MPEG digital picture signal represents a sequence of frames including intra-frames and inter-frames. Here, the intra-frames are generated by an intra-frame encoding process while the inter-frames are generated by an inter-frame predictive encoding process.

There is a digital VTR (video tape recorder) which records a digital picture signal on a magnetic tape. A typical digital picture signal to be recorded results from orthogonal transform implementing data amount compression. An example of such a digital picture signal is an MPEG digital picture signal. As previously indicated, the digital picture signal of this type represents a sequence of frames including intra-frames and inter-frames. Accordingly, on the magnetic tape loaded with the digital picture signal by the digital VTR, there is a mixture of signal segments corresponding to intra-frames and signal segments corresponding to inter-frames. Generally, the positions of intra-frame-corresponding signal segments on the magnetic tape have a given period. A picture can be reproduced from only one signal segment corresponding to an intra-frame while a picture can not be reproduced from only one signal segment corresponding to an inter-frame. Accordingly, a conventional technique for special playback such as high-speed search playback in a VTR of the VHS format can not be applied to special reproduction of picture information from such a digital VTR magnetic tape.

SUMMARY OF THE INVENTION

It is an object of this invention to provide an improved apparatus for recording a digital picture signal.

A first aspect of this invention provides an apparatus for recording a digital picture signal on a recording medium, comprising first means for deleting code words, which correspond to orthogonal-transform-resultant coefficients having order numbers equal to or higher than an order number "n+1", from code words composing each 1-intra-frame segment of an input digital picture signal to generate special picture data with a frame period NS on the basis of the input digital picture signal; second means for estimating a code amount CF(nmin) of special picture data generated by deleting code words, which correspond to orthogonal-transform-resultant coefficients having order numbers equal to or higher than an order number "nmin+1", from code words composing a 1-intra-frame segment of the input digital picture signal, where "nmin" denotes a lower limit of an order number "n"; third means for deciding the frame period NS of the special picture data and a target code amount C so that the code amount CF(nmin) estimated by the second means will be equal to or smaller than the target code amount C; fourth means for recording the input digital picture signal on the recording medium; and fifth means for recording the special picture data generated by the first means on predetermined positions in the recording medium.

A second aspect of this invention is based on the first aspect thereof, and provides an apparatus wherein the third means comprises means for deciding whether or not the code amount CF(nmin) estimated by the second means is greater than the target code amount C; means for preventing at least a next 1-intra-frame segment of the input digital picture signal from being used by the first means to generate the special picture data; and means for incrementing the target code amount C by a value equal to a code amount corresponding to the next 1-intra-frame segment of the input digital picture signal.

A third aspect of this invention is based on the first aspect thereof, and provides an apparatus further comprising sixth means for estimating a code amount CF(n) of the special picture data generated by the first means per intra-frame; seventh means for estimating a code amount CF(n+1) of special picture data generated by deleting code words, which correspond to orthogonal-transform-resultant coefficients having order numbers equal to or higher than an order number "n+2", from code words composing a 1-intra-frame segment of the input digital picture signal; and eighth means for deciding the order number "n" so that the target code amount C will exist between the code amount CF(n) estimated by the sixth means and the code amount CF(n+1) estimated by the seventh means.

A fourth aspect of this invention is based on the first aspect thereof, and provides an apparatus further comprising sixth means for referring to motion vector data in the input digital picture signal, and thereby detecting a degree of motion in a picture represented by the input digital picture signal; and seventh means for decreasing the lower limit "nmin" as the motion degree detected by the sixth means increases.

A fifth aspect of this invention provides an apparatus for processing and recording a digital picture signal representing a sequence of frames including intra-frames and inter-frames, the intra-frames relating to segments of the digital picture signal which result from intra-frame encoding, the inter-frames relating to segments of the digital picture signal which result of inter-frame encoding, the digital picture signal having a sequence of code words related to DCT coefficients resulting from DCT block encoding, the DCT coefficients being arrangement in a given order for every block, the apparatus comprising first means for deleting code words, which correspond to DCT coefficients having arrangement order numbers higher than an arrangement order number "n", from code words related to each of blocks composing a 1-intra-frame segment of the input digital picture signal to generate special picture data on the basis of the digital picture signal; second means for estimating an amount of the special picture data generated by the first means per intra-frame; third means for controlling the arrangement order number "n" in response to the amount of the special picture data which is estimated by the second means; fourth means for recording the digital picture signal on first areas of a recording medium; and fifth means for recording the special picture data generated by the first means on second areas of the recording medium which differ from the first areas.

A sixth aspect of this invention provides an apparatus for processing and recording a digital picture signal representing a sequence of frames including intra-frames and inter-frames, the intra-frames relating to segments of the digital picture signal which result from intra-frame encoding, the inter-frames relating to segments of the digital picture signal which result from inter-frame encoding, the apparatus comprising first means for generating special picture data on the basis of 1-intra-frame segments of the digital picture signal; second means for estimating an amount of the special picture data generated by the first means per intra-frame; third means for selectively discarding a 1-intra-frame segment of the digital picture signal, and thereby preventing said 1-intra-frame segment of the digital picture signal from being used by the first meas in response to the amount estimated by the second means; fourth means for recording the digital picture signal on first areas of a recording medium; and fifth means for recording the special picture data generated by the first means on second areas of the recording medium which differ from the first areas.

DESCRIPTION OF THE PREFERRED EMBODIMENTS

First Embodiment

Figure 1:
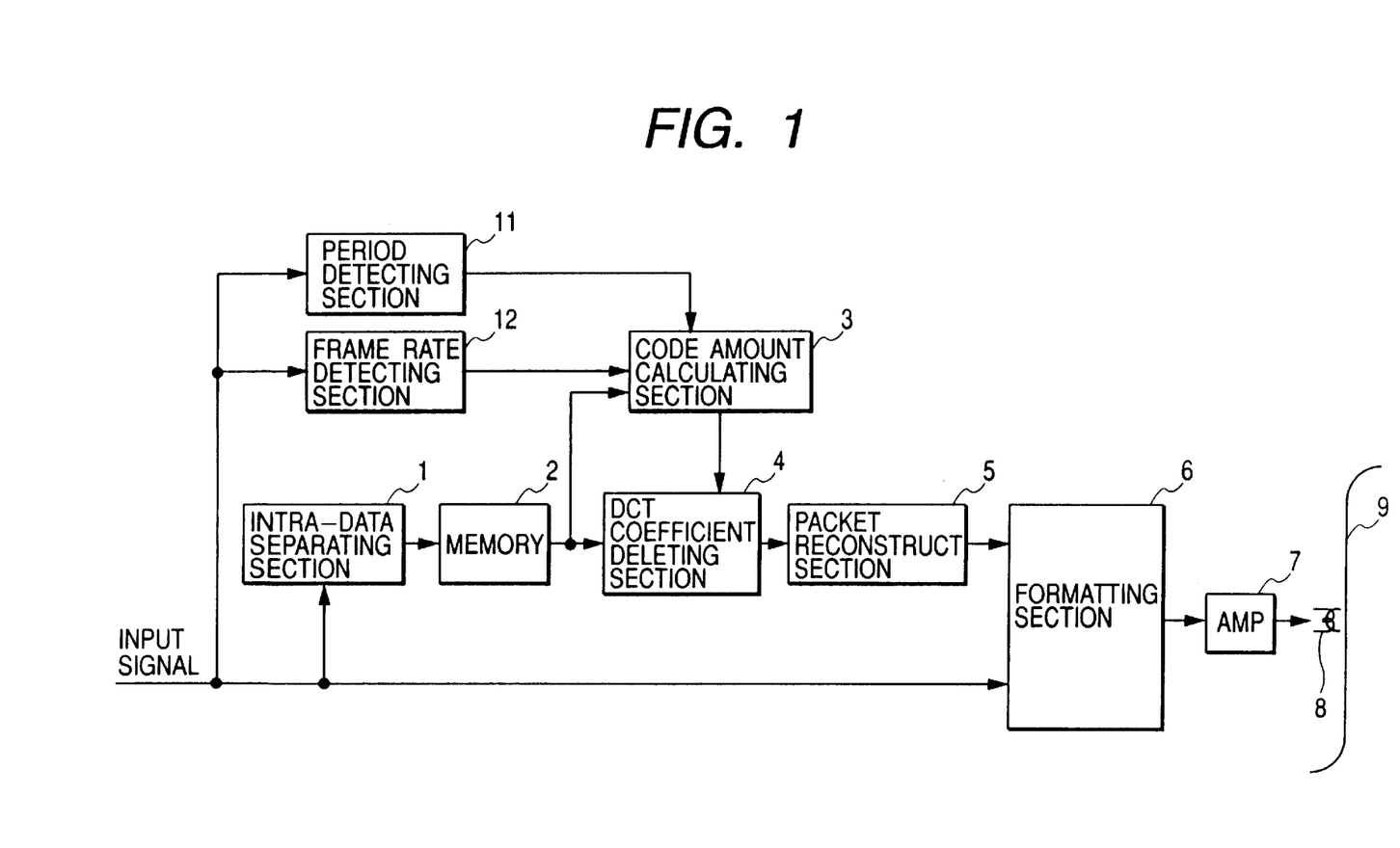
FIG. 1 is a diagram of a digital VTR according to a first embodiment of this invention.

With reference to FIG. 1, a digital VTR (video tape recorder) includes an intra-data separating section 1 receiving an input digital picture signal. The input digital picture signal has an MPEG transport stream of packets of digital data including video data. The MPEG transport packet stream is generated by making an MPEG data stream into a sequence of packets. The MPEG data stream contains data corresponding to intra-frames and data corresponding to inter-frames. Here, the intra-frames are generated by an intra-frame encoding process while the inter-frames are generated by an inter-frame predictive encoding process.

The digital VTR of FIG. 1 records the input digital picture signal on predetermined normal areas of a magnetic tape 9. The input digital picture signal is also referred to as the main digital picture signal or the main picture data. The digital VTR of FIG. 1 generates an additional digital picture signal on the basis of the input digital picture signal. The additional digital picture signal is designed so that effective images can be reproduced during special playback such as high-speed playback for search. The digital VTR of FIG. 1 records the additional digital picture signal on predetermined special areas of the magnetic tape 9 which differ from the normal areas thereof. The additional digital picture signal is also referred to as the special digital picture signal or the special picture data.

During normal playback, the digital VTR of FIG. 1 reads out the main digital picture signal from the magnetic tape 9. During special playback, the digital VTR of FIG. 1 reads out the additional digital picture signal from the magnetic tape 9.

The intra-data separating section 1 separates intra-frame-related data (intra-frame data) from the input digital picture signal. The intra-data separating section 1 outputs the separated intra-frame data to a memory 2. The memory 2 stores the intra-frame data. The intra-frame data is read out from the memory 2 before being fed to a code amount calculating section 3 and a DCT coefficient deleting section 4.

An intra-frame period detecting section 11 receives the input digital picture signal, and detects the period N of intra-frames represented by the input digital picture signal. The period N is expressed by the number of frames between two adjacent intra-frames. The intra-frame period detecting section 11 informs the code amount calculating section 3 of the detected intra-frame period N.

A frame rate detecting section 12 receives the input digital picture signal, and detects the frame rate F of the input digital picture signal. The frame rate detecting section 12 informs the code amount calculating section 3 of the detected frame rate F.

Before an explanation of the code amount calculating section 3 and the DCT coefficient deleting section 4, variable-length encoding on DCT coefficients will be explained. Every frame represented by a digital picture signal is divided into blocks each having a given number of adjacent pixels, for example, 8 by 8 adjacent pixels. Segments of the digital picture signal which correspond to the respective blocks in one frame are successively subjected to DCT (discrete cosine transform). For every block, a DCT-resultant signal segment represents a set of 64 DCT coefficients.

Figure 2:
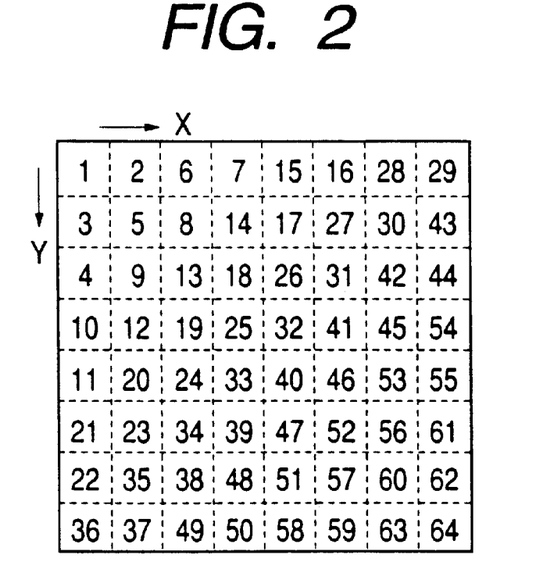
FIG. 2 is a diagram of the arrangement order numbers of DCT coefficients composing one DCT block.

As shown in FIG. 2, 64 DCT coefficients for one DCT block are arranged in a zigzag scan order along a time base. In FIG. 2, the numerals denote arrangement order numbers respectively. The DCT coefficient "1", that is, the first DCT coefficient, corresponds to a data piece representing a direct-current signal component. The DCT coefficient "2" (the second DCT coefficient) to the DCT coefficient "64" (the sixty-fourth DCT coefficient or the last DCT coefficient) correspond to data pieces representing alternating-current signal components. The frequency order number of a DCT coefficient increases as the arrangement order number thereof increases. Thus, the DCT coefficient "2" to the DCT coefficient "64" are arranged also in the order from the lowest frequency toward the highest frequency. Accordingly, the frequency order number and the arrangement order number can be regarded as being substantially equivalent to each other.

Figure 3:
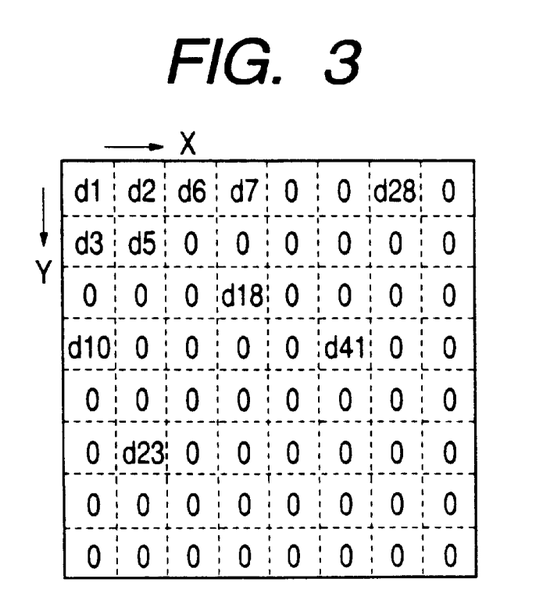
FIG. 3 is a diagram of an example of the states of DCT coefficients composing one DCT block.

FIG. 3 shows an example of the states of 64 DCT coefficients. In the example of FIG. 3, the DCT coefficients "1", "2", "3", "5", "6", "7", "10", "18", "23", "28", and "41" correspond to non-zero levels d1, d2, d3, d5, d6, d7, d10, d18, d23, d28, and d41 respectively while the other DCT coefficients correspond to the zero level. Variable-length encoding assigns a code word to each combination of the number of successive zero DCT coefficients (the zero run length) and the level of a subsequent non-zero DCT coefficient. Each code word is expressed as a set "(zero run length, non-zero level)". The second DCT coefficient "2" to the last DCT coefficient "64" in the example of FIG. 3 are encoded into a sequence of code words (0, d2), (0, d3), (1, d5), (0, d6), (0, d7), (2, d10), (7, d18), (4, d23), (4, d28), and (12, d41) followed by an EOB code word representing the end of a block. The direct-current signal component d1, that is, the first DCT coefficient "1", is encoded separately. The result of the encoding of the first DCT coefficient "1" and the result of the encoding of the second DCT coefficient "2" to the last DCT coefficient "64" are combined into a 1-block-corresponding segment of a final encoding-resultant signal. An EOB code word is added to the end of every 1-block-corresponding segment of the final encoding-resultant signal.

The intra-frame data fed from the memory 2 to the code amount calculating section 3 and the DCT coefficient deleting section 4 corresponds to such a final encoding-resultant signal.

To implement data amount reduction, the DCT coefficient deleting section 4 deletes a code word or code words having the arrangement order number (n+1) and higher from the intra-frame data for every block. Here, "n" denotes a critical arrangement order number. The DCT coefficient deleting section 4 is informed of the critical arrangement order number "n" by the code amount calculating section 3. The DCT coefficient deleting section 4 uses one of two deletion techniques "A" and "B".

According to the deletion technique "A", when the level dn of a DCT coefficient "n" (having the arrangement order number "n") is non-zero, a code word or code words between the code word ( . . . , dn) and the EOB code word are deleted. When the level dn of the DCT coefficient "n" (having the arrangement order number "n") is zero, the first code word ( . . . , dm) after the "n" place and a later code word or code words before the EOB code word are deleted. Here, "m">"n".

According to the deletion technique "B", when the level dn of a DCT coefficient "n" (having the arrangement order number "n") is non-zero, a code word or code words between the code word ( . . . , dn) and the EOB code word are deleted. When the level dn of the DCT coefficient "n" (having the arrangement order number "n") is zero, the second code word ( . . . , dk) after the "n" place and a later code word or code words before the EOB code word are deleted.

Here, "k">"n". In this case, the first code word ( . . . , dm) after the "n" place is not deleted.

In general, reproduced images deteriorate as the critical arrangement order number "n" decreases. To prevent reproduced images from significantly deteriorating, it is preferable to hold the critical arrangement order number "n" equal to or greater than a lower limit "nmin" predetermined in accordance with playback speed.

The code amount calculating section 3 processes the intra-frame data and thereby estimates a total number of bits or a code amount CF(nmin) per intra-frame which results from the deletion of a code word or code words having the arrangement order number (nmin+1) and higher. In addition, the code amount calculating section 3 processes the intra-frame data and thereby estimates a total number of bits or a code amount CF(n) per intra-frame which results from the deletion of a code word or code words having the arrangement order number (n+1) and higher. Furthermore, the code amount calculating section 3 processes the intra-frame data and thereby estimates a total number of bits or a code amount CF(n+1) per intra-frame which results from the deletion of a code word or code words having the arrangement order number (n+2) and higher. For example, the signal processing to estimate the code amounts CF(nmin), CF(n), and CF(n+1) is similar to the signal processing by the DCT coefficient deleting section 4.

The code amount calculating section 3 decides a target code amount C (a target total number of bits) per intra-frame and a period NS of intra-frames used for generation of the special picture data so that the following condition will be satisfied.

$$CF(nmin) \leq C$$

In addition, the code amount calculating section 3 decides the critical arrangement order number "n" so that the following conditions will be satisfied.

$$CF(n) \leq C < CF(n+1)$$

The code amount calculating section 3 calculates a record capacity Cg for the special picture data per intra-frame by referring to the following equation.

$$Cg = R \cdot N/F \text{(bit)}$$

where N denotes the period (frame) of intra-frames represented by the input digital picture signal, and F denotes the frame rate (frame/second) of the input digital picture signal and R denotes a predetermined recording rate (bit/second) for the special picture data. Generally, the code amount calculating section 3 uses the record capacity Cg as the target code amount C. As previously explained, the code amount calculating section 3 is informed of the intra-frame period N by the intra-frame period detector 11. In addition, the code amount calculating section 3 is informed by the frame rate F by the frame rate detecting section 12.

When the target code amount C is smaller than the estimated code amount CF(nmin), that is, when C<CF(min), the code amount calculating section 3 instructs the DCT coefficient deleting section 4 to discard data pieces corresponding to at least a next intra-frame. In addition, the code amount calculating section 3 increments the target code amount C by the code amount (the record capacity) Cg corresponding to the next intra-frame. Thus, the code amount calculating section 3 updates the target code amount according to a statement as "C=C+Cg". These steps are iterated until the target code amount C becomes equal to or greater than the estimated code amount CF(nmin), that is, until the condition "C≧CF(nmin)" is satisfied.

Regarding every used intra-frame (every undiscarded intra-frame), a code word or code words corresponding to arrangement order numbers equal to or smaller than the lower limit "nmin" are undeleted. Accordingly, it is possible to prevent reproduced images from significantly deteriorating.

In the case where the target code amount C is smaller than the estimated code amount CF(nmin) when the target code amount C is equal to the record capacity Cg, and where the target code amount C is equal to or greater than the estimated code amount CF(nmin) when the target code amount C is equal to twice the record capacity Cg, the period NS of intra-frames used for generation of the special picture data is equal to twice the intra-frame period N. In the case where the target code amount C is smaller than the estimated code amount CF(nmin) when the target code amount C is equal to twice the record capacity Cg, and where the target code amount C is equal to or greater than the estimated code amount CF(nmin) when the target code amount C is equal to three times the record capacity Cg, the period NS of intra-frames used for generation of the special picture data is equal to three times the intra-frame period N.

As previously explained, when the target code amount C is smaller than the estimated code amount CF(nmin), data pieces corresponding to at least a next intra-frame are discarded. In addition, the target code amount C is incremented. When the target code amount C becomes equal to or greater than the estimated code amount CF(nmin), the code amount calculating section 3 decides the critical arrangement order number "n" so that the conditions "CF(n)≦C<CF(n+1)" will be satisfied. The code amount calculating section 3 informs the DCT coefficient deleting section 4 of the decided critical arrangement order number "n". As previously explained, the DCT coefficient deleting section 4 deletes a code word or code words having the arrangement order number (n+1) and higher from the intra-frame data for every block. The deletion-resultant intra-frame data (the processing-resultant intra-frame data) generated by the DCT coefficient deleting section 4 is used as the special picture data.

The DCT coefficient deleting section 4 outputs the deletion-resultant intra-frame data (the special picture data) to a packet reconstructing section 5. The packet reconstructing section 5 makes the deletion-resultant intra-frame data into a sequence of packets in a format similar to the format of packets in the input digital picture signal. The packet reconstructing section 5 outputs a sequence of packets of the special picture data to a formatting section 6.

The formatting section 6 receives the input digital picture signal (the main picture data). The formatting section 6 multiplexes the main picture data and the special picture data into a composite signal of a given recording format. The main picture data is placed in first predetermined time domains with respect to the composite signal while the special picture data is placed in second predetermined time domains separated by the first predetermined time domains. The first predetermined time domains correspond to the normal areas of the magnetic tape 9 while the second predetermined time domains correspond to the special areas of the magnetic tape 9. The composite signal is transmitted from the formatting section 6 to a magnetic head 8 via a recording amplifier 7. The magnetic head 8 records the composite signal on a magnetic tape 9 while scanning the magnetic tape 9 on a helical scan basis.

Figure 4:
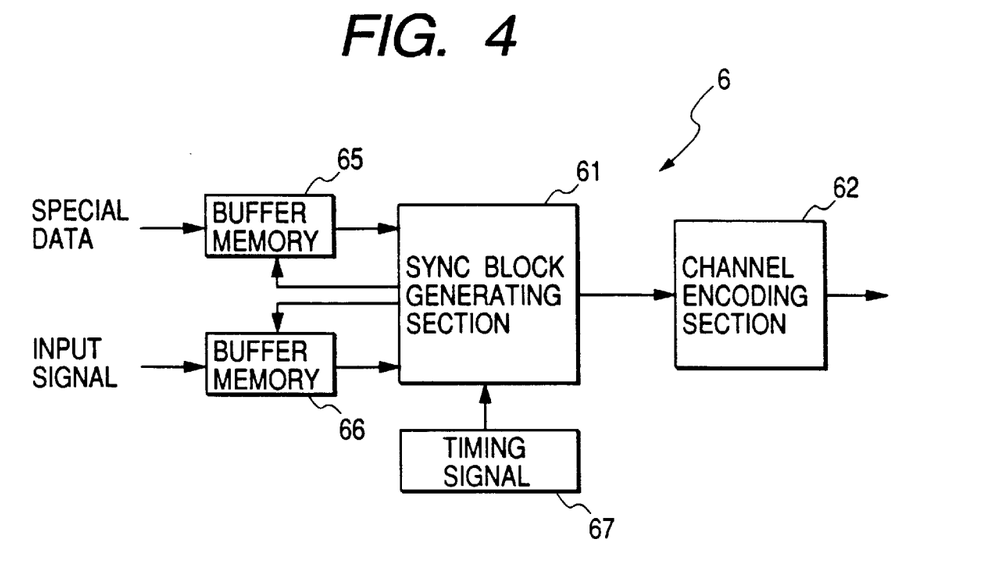
FIG. 4 is a diagram of a formatting section in FIG. 1.

As shown in FIG. 4, the formatting section 6 has a sync block generating section 61, a channel encoding section 62, buffer memories 65 and 66, and a timing signal generator 67. The buffer memory 65 stores the special picture data outputted from the packet reconstructing section 5. The buffer memory 66 stores the main picture data (the input digital picture signal). The timing signal generator 67 produces a timing signal in response to, for example, the output signal of an internal clock signal generator. The produced timing signal provides timings which correspond to the boundaries between the first predetermined time domains for the main picture data and the second predetermined time domains for the special picture data. The timing signal generator 67 outputs the produced timing signal to the sync block generating section 61.

The sync block generating section 61 receives the data discarding instruction from the code amount calculating section 3 (see FIG. 1). The sync block generating section 61 selectively accesses one of the buffer memories 65 and 66 to read out the main picture data or the special picture data therefrom in response to the timing signal outputted from the timing signal generator 67. During time intervals corresponding to the first predetermined time domains for the main picture data, the sync block generating section 61 accesses the buffer memory 66 and reads out the main picture data therefrom. During time intervals corresponding to the second predetermined time domains for the special picture data, the sync block generating section 61 accesses the buffer memory 65 and reads out the special picture data therefrom in the absence of the data discarding instruction. On the other hand, the sync block generating section 61 fails to access the buffer memory 65 in the presence of the data discarding instruction. The sync block generating section 61 produces a sync pattern signal and an ID code signal. The sync pattern signal can be used to discriminate sync blocks from each other. The ID code signal contains information of a track number. The sync block generating section 61 produces an error correction code signal in response to the readout main picture data and the readout special picture data. The sync block generating section 61 multiplexes the readout main picture data, the readout special picture data, the sync pattern signal, the ID code signal, and the error correction code signal into a sequence of sync blocks.

The channel encoding section 62 follows the sync block generating section 61, and receives the sync-block sequence therefrom. The channel encoding section 62 converts the sync-block sequence into a data sequence suited for record on the magnetic tape 9. The channel encoding section 62 outputs the data sequence as the composite signal which is fed to the magnetic head 8 via the recording amplifier 7.

For example, the magnetic head 8 includes two sub heads mounted on a rotary drum and having different azimuths respectively. The magnetic head 8 rotates together with the rotary drum. The magnetic tape 9 is wound on the rotary drum along a helix.

Figure 5:
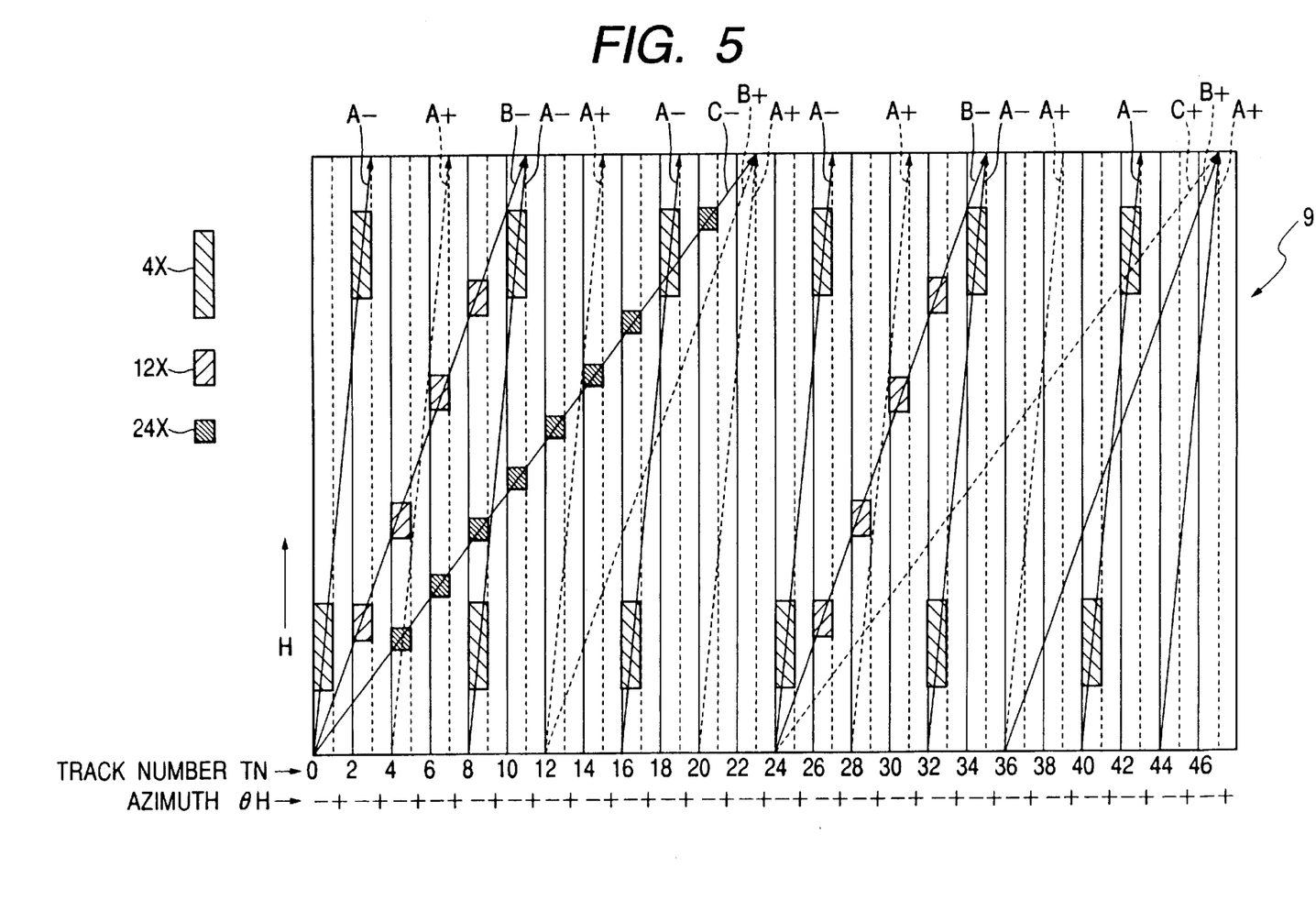
FIG. 5 is a diagram of tracks on a magnetic tape, and special areas arranged on the tracks.

FIG. 5 shows an example of the arrangement of the main picture data and the special picture data on the magnetic tape 9 which occurs when the magnetic head 8 is rotated at a speed of 30 revolutions per second. The azimuths of the two sub heads in the magnetic head 8 are denoted by θH− and θH+ respectively. With reference to FIG. 5, during normal recording or normal playback, even-numbered tracks on the magnetic tape 9 are scanned by the sub head having the azimuth θH− while odd-numbered tracks on the magnetic tape 9 are scanned by the sub head having the azimuth θH+. In FIG. 5, the arrow H indicates the direction of the scanning by the two sub heads which occurs during normal recording or normal playback.

With reference to FIG. 5, the magnetic tape 9 is divided into normal areas and special areas. The special areas are illustrated as hatched areas, and are denoted by 4X, 12X, and 24X. The special areas 4X, 12X, and 24X are spaced from each other by the normal areas along the scanning direction. The special picture data is placed in the special areas 4X, 12X, and 24X while the main picture data is placed in the normal areas. The special areas 4X are designed for search playback at a speed equal to four times the normal playback speed. The special areas 12X are designed for search playback at a speed equal to twelve times the normal playback speed. The special areas 24X are designed for search playback at a speed equal to twenty-four times the normal playback speed.

During search playback (special playback), the special areas 4X, 12X, and 24X are scanned by only the sub head having the azimuth θH−. Thus, search playback (special playback) uses only the sub magnetic head having the azimuth θH−.

During search playback at a speed equal to four times the normal playback speed, the special areas 4X are successively scanned by the sub head having the azimuth θH− so that the special picture data is read out from the special areas 4X. In this case, the sub head having the azimuth θH− moves relative to the magnetic tape 9 along trajectories A− (see FIG. 5). On the other hand, the sub head having the azimuth θH+ moves relative to the magnetic tape 9 along trajectories A+ (see FIG. 5) which do not meet any special areas 4X.

During search playback at a speed equal to twelve times the normal playback speed, the special areas 12X are successively scanned by the sub head having the azimuth θH− so that the special picture data is read out from the special areas 12X. In this case, the sub head having the azimuth θH− moves relative to the magnetic tape 9 along trajectories B− (see FIG. 5). On the other hand, the sub head having the azimuth θH+ moves relative to the magnetic tape 9 along trajectories B+ (see FIG. 5) which do not meet any special areas 12X.

During search playback at a speed equal to twenty-four times the normal playback speed, the special areas 24X are successively scanned by the sub head having the azimuth θH− so that the special picture data is read out from the special areas 24X. In this case, the sub head having the azimuth θH− moves relative to the magnetic tape 9 along trajectories C− (see FIG. 5). On the other hand, the sub head having the azimuth θH+ moves relative to the magnetic tape 9 along trajectories C+ (see FIG. 5) which do not meet any special areas 24X.

Regarding the example in FIG. 5, the input digital picture signal has a frame rate F of 30 frame/second, and the intra-frame period N is equal to 15 frames (corresponding to 0.5 second). Here, the letter "m" is introduced as an indication of the code amount (the total bit number) which can be recorded on each special area 4X. The previously-indicated record capacity Cg for the special picture data per intra-frame is equal to 8m since there are eight special areas 4X on a 30-track region of the magnetic tape 9. Specifically, eight special areas 4X extend on tracks having order numbers TN of "0", "2", "8", "10", "16", "18", "24", and "26" as shown in FIG. 5.

Figure 6:
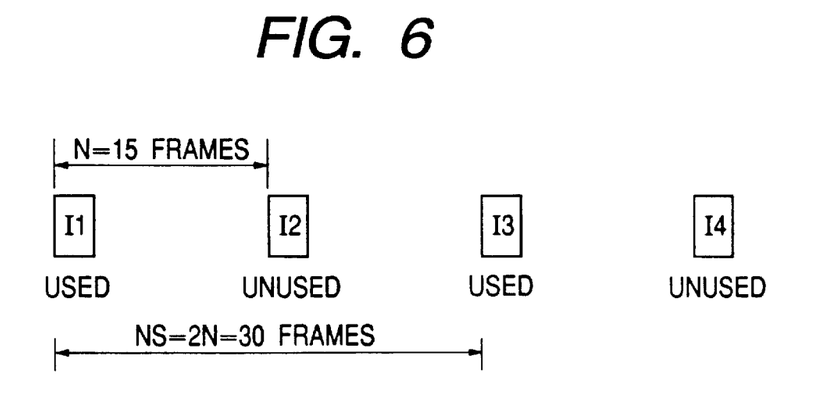
FIG. 6 is a diagram of a sequence of intra-frames, and information of whether or not data pieces representing the intra-frames are used.

In the case where the target code amount C is smaller than the estimated code amount CF(nmin) when the target code amount C is equal to the record capacity Cg(=8 m), and where the target code amount C is equal to or greater than the estimated code amount CF(nmin) when the target code amount C is equal to twice the record capacity Cg(=16 m), data pieces related to odd-numbered intra-frames I1, I3, . . . are used for generation of the special picture data while data pieces related to even-numbered intra-frames I2, I4, . . . are discarded as shown in FIG. 6. Accordingly, in this case, the period NS of intra-frames used for generation of the special picture data is equal to twice the intra-frame period N. Thus, the period NS is equal to 30 frames.

The special picture data assigned to the special areas 12X and the special picture data assigned to the special areas 24X are generated similarly to the above-explained generation of the special picture data assigned to the special areas 4X.

The digital VTR of FIG. 1 may be modified as follows. A first modification of the digital VTR of FIG. 1 is designed for an input digital picture signal of the intra slice type in which an intra mode is periodically implemented in unit of slice to refresh a picture represented by the input digital picture signal. In the first modification of the digital VTR of FIG. 1, data pieces of intra slices from an uppermost intra slice to a lowermost intra slice with respect to a display screen are collected into a data set in a time series order. The data set is subjected to data processing similar to the previously-mentioned data processing while being regarded as data corresponding to one intra frame.

A second modification of the digital VTR of FIG. 1 uses a magnetic disk instead of the magnetic tape 9.

Second Embodiment

Figure 7:
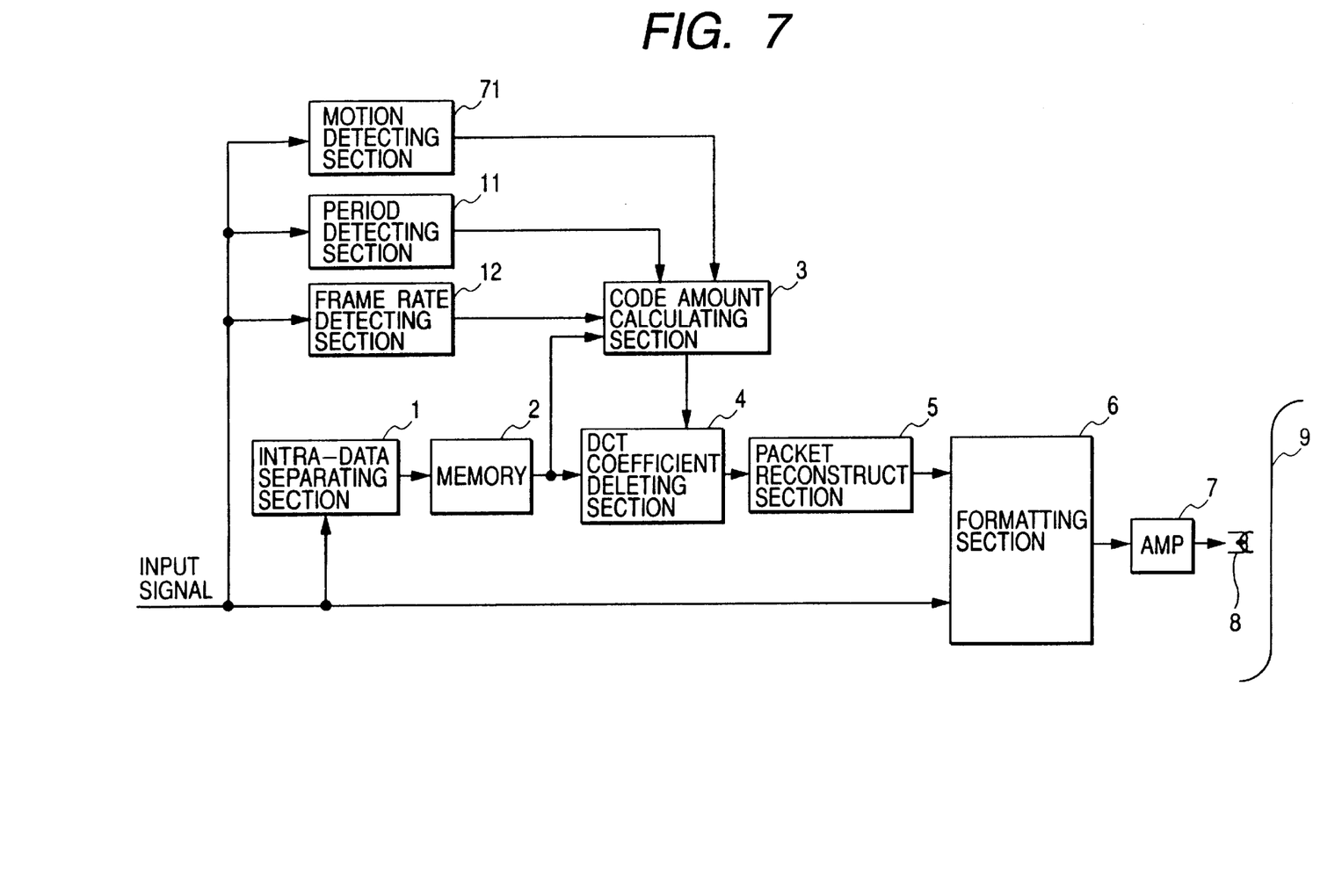
FIG. 7 is a diagram of a digital VTR according to a second embodiment of this invention.

FIG. 7 shows a digital VTR which is similar to the digital VTR of FIG. 1 except for the following design changes. The digital VTR of FIG. 7 includes a motion detecting section 71. The motion detecting section 71 refers to motion vector data contained in the input digital picture signal, and thereby detects the degree of motion in pictures represented by the input digital picture signal. The motion detecting section 71 informs the code amount calculating section 3 of the detected degree of motion. The code amount calculating section 3 decreases the lower limit "nmin" of the critical arrangement order number "n" as the detected degree of motion increases. The digital VTR of FIG. 7 is able to optimize a balance between a reproduced image quality and a frame rate of special picture data.

What is claimed is:

1. An apparatus for recording a digital picture signal on a recording medium, comprising:

first means for deleting code words, which correspond to orthogonal-transform-resultant coefficients having order numbers equal to or higher than an order number "n+1", from code words composing each 1-intra-frame segment of an input digital picture signal to generate special picture data with a frame period NS on the basis of the input digital picture signal;

second means for estimating a code amount CF(nmin) of special picture data generated by deleting code words, which correspond to orthogonal-transform-resultant coefficients having order numbers equal to or higher than an order number "nmin+1", from code words composing a 1-intra-frame segment of the input digital picture signal, where "nmin" denotes a lower limit of an order number "n";

third means for deciding the frame period NS of the special picture data and a target code amount C so that the code amount CF(nmin) estimated by the second means will be equal to or smaller than the target code amount C;

fourth means for recording the input digital picture signal on the recording medium; and fifth means for recording the special picture data generated by the first means on predetermined positions in the recording medium.

2. The apparatus of claim 1, wherein the third means comprises:

means for deciding whether or not the code amount CF(nmin) estimated by the second means is greater than the target code amount C;

means for preventing at least a next 1-intra-frame segment of the input digital picture signal from being used by the first means to generate the special picture data; and means for incrementing the target code amount C by a value equal to a code amount corresponding to the next 1-intra-frame segment of the input digital picture signal.

3. The apparatus of claim 1, further comprising:

sixth means for estimating a code amount CF(n) of the special picture data generated by the first means per intra-frame;

seventh means for estimating a code amount CF(n+1) of special picture data generated by deleting code words, which correspond to orthogonal-transform-resultant coefficients having order numbers equal to or higher than an order number "n+2", from code words composing a 1-intra-frame segment of the input digital picture signal; and eighth means for deciding the order number "n" so that the target code amount C will exist between the code amount CF(n) estimated by the sixth means and the code amount CF(n+1) estimated by the seventh means.

4. The apparatus of claim 1, further comprising:

sixth means for referring to motion vector data in the input digital picture signal, and thereby detecting a degree of motion in a picture represented by the input digital picture signal; and seventh means for decreasing the lower limit "nmin" as the motion degree detected by the sixth means increases.

5. An apparatus for processing and recording a digital picture signal representing a sequence of frames including intra-frames and inter-frames, the intra-frames relating to segments of the digital picture signal which result from intra-frame encoding, the inter-frames relating to segments of the digital picture signal which result of inter-frame encoding, the digital picture signal having a sequence of code words related to DCT coefficients resulting from DCT block encoding, the DCT coefficients being arrangement in a given order for every block, the apparatus comprising:

first means for deleting code words, which correspond to DCT coefficients having arrangement order numbers higher than an arrangement order number "n", from code words related to each of blocks composing a 1-intra-frame segment of the input digital picture signal to generate special picture data on the basis of the digital picture signal;

second means for estimating an amount of the special picture data generated by the first means per intra-frame;

third means for controlling the arrangement order number "n" in response to the amount of the special picture data which is estimated by the second means;

fourth means for recording the digital picture signal on first areas of a recording medium; and fifth means for recording the special picture data generated by the first means on second areas of the recording medium which differ from the first areas.

6. An apparatus for processing and recording a digital picture signal representing a sequence of frames including intra-frames and inter-frames, the intra-frames relating to segments of the digital picture signal which result from intra-frame encoding, the inter-frames relating to segments of the digital picture signal which result from inter-frame encoding, the apparatus comprising:

first means for generating special picture data on the basis of 1-intra-frame segments of the digital picture signal;

second means for estimating an amount of the special picture data generated by the first means per intra-frame;

third means for selectively discarding a 1-intra-frame segment of the digital picture signal, and thereby preventing said 1-intra-frame segment of the digital picture signal from being used by the first meas in response to the amount estimated by the second means;

fourth means for recording the digital picture signal on first areas of a recording medium; and fifth means for recording the special picture data generated by the first means on second areas of the recording medium which differ from the first areas.

* * * * *